(12) United States Patent
Brenner et al.

(10) Patent No.: US 7,154,037 B2
(45) Date of Patent: Dec. 26, 2006

(54) CONNECTOR PIECE, FLUID LINE AND HYDRAULIC DEVICE

(75) Inventors: Hans-Walter Brenner, Stuttgart (DE); Wolf-Dieter Kerscher, Kirchheim (DE); Klaus Zoller, Stuttgart (DE)

(73) Assignee: Festo AG & Co., Esslingen (DE)

( * ) Notice: Subject to any disclaimer, the term of this patent is extended or adjusted under 35 U.S.C. 154(b) by 110 days.

(21) Appl. No.: 10/495,857

(22) PCT Filed: Nov. 22, 2002

(86) PCT No.: PCT/EP02/13110

§ 371 (c)(1),
(2), (4) Date: May 17, 2004

(87) PCT Pub. No.: WO03/046428

PCT Pub. Date: Jun. 5, 2003

(65) Prior Publication Data

US 2004/0256127 A1    Dec. 23, 2004

(30) Foreign Application Priority Data

Nov. 28, 2001 (DE) ............................ 201 19 352 U

(51) Int. Cl.
*H01R 13/00* (2006.01)
(52) U.S. Cl. .................................................. 174/21 JS
(58) Field of Classification Search .................. 174/19, 174/21 R, 21 JS
See application file for complete search history.

(56) References Cited

U.S. PATENT DOCUMENTS 2,389,895 A   11/1945  Colley et al.
6,783,379 B1 * 8/2004  Kerscher et al. ............ 439/191
7,066,750 B1 * 6/2006  Claus et al. ................. 439/194

FOREIGN PATENT DOCUMENTS

| | | |
|---|---|---|
| DE | 46 915 | 7/1966 |
| DE | 27 46 093 A1 | 4/1978 |
| DE | 29 37 164 A1 | 3/1980 |
| DE | 34 08 135 A1 | 9/1985 |
| DE | 196 20 422 A1 | 11/1996 |
| DE | 100 54 561 A1 | 5/2002 |
| EP | 0 142 944 A2 | 5/1985 |
| JP | 08 270 845 | 10/1996 |

* cited by examiner

Primary Examiner—Chau Nguyen N.
(74) Attorney, Agent, or Firm—Hoffmann & Baron, LLP

(57) ABSTRACT

A connection union for a fluid line (11) containing a fluid duct (14) has at least one signal conductor (16a and 16b) in the wall (15) of the fluid line (11) for the transmission of electrical and/or optical signal. The connection union a fluid line socket (23) and a holding device (25) for the fluid line (11) and at least one signal contact (31a; 31b) for the production of a connection with the at least one signal conductor (16a and 16b). The at least one signal contact (31a; 31b) is able to be slid in the insertion direction (28) of the fluid line (11; 68 through 71) and is provided with spring means (37) so that during a longitudinal movement of the fluid line (11) mounted on the connection union (10) the at least one signal contact (31a; 31b) remains connected with the at least one signal conductor (16a and 16b). Moreover the invention contemplates a suitable fluid line (11) and a fluid power means belonging to it.

40 Claims, 8 Drawing Sheets

CONNECTOR PIECE, FLUID LINE AND HYDRAULIC DEVICE This application claims priority based on an International Application filed under the Patent Cooperation Treaty, PCT/EP02/131 10, filed on Nov. 22, 2002, and German Patent Application No. DE 201 19 352.3, filed on Nov. 28, 2001.

FIELD OF THE INVENTION

The invention relates to a connection union for a fluid line containing a fluid duct, whose wall comprises at least one signal conductor for the transmission of electrical and/or optical signals, comprising a socket for the fluid line, a holding device for holding the fluid line in the mounted state and at least one signal contact for the production of a connection with the at least one signal conductor.

The invention furthermore relates to a fluid line for such a connection union, comprising a fluid line and a wall, which has at least one signal conductor for the transmission of electrical and/or optical signals and furthermore a fluid power means, as for example a valve arrangement, a servicing device having such a connection union or, respectively, such a fluid line.

BACKGROUND OF THE INVENTION

The Japanese patent publication P-H8-270845 describes for example a fluid line with two electrical signal conductors arranged in its wall. The fluid line is able to be plugged into a connection union. In the connection part the signal conductors project beyond the fluid line and make electrical contact with the signal contacts of the connection union for contact connection. The connection union and, respectively, the fluid line are arranged on a fluid power means.

By way of the fluid line it is possible for both a fluid pressure medium and also control and/or information signals to be transmitted to and from a fluid power means. However the security of making contact in the connection between the signal conductor on the fluid line side and the signal contact of the connection union is problematical. The fluid line is loaded by the fluid, that is to say the pressure medium, and is consequently in no way statically and permanently connected with the connection union. In fact, there are pressure fluctuations, more particularly in the case of pressure surges, causing a longitudinal movement of the fluid line, inter alia in its connection part as well,at which it is seated in the connection union. Therefore the at least one signal contact can not, even if it tends to resiliently give way and comply with the longitudinal movement, at all times reliably ensure the necessary contact connection with the respective signal conductor. The contact problems may result in malfunctioning or even damage or destruction of the parts, if for example electrical or, respectively, optical short circuits occur or a control or information signal is not transmitted or is not correctly transmitted.

SUMMARY OF THE INVENTION

It is consequently one object of the invention to improve the reliability of making contact between the at least one signal conductor and the at least one signal contact in the case of a connection union or respectively a fluid line and a fluid power means of the type initially mentioned.

In order to attain this a connection union of the type initially mentioned there is a provision such that the at least one signal contact is able to be slid in the insertion direction of the fluid line and that spring means are provided for the at least one signal contact acting toward an insertion opening for the fluid line so that in the case of a longitudinal movement of the fluid line mounted on the connection union the at least one signal contact remains connected with the at least one signal conductor.

In order to achieve the object in the case of the fluid line of the type initially mentioned there is the provision that it possesses an end face provided for the connection to the connection union, with which the at least one signal conductor is flush or in relation to same the at least one signal conductor is retracted.

In the case of the fluid power means of the type initially mentioned there is , in order to achieve the object, at least one such connection union and/or at least one such fluid line.

A basic principle of the invention is in this case that the signal contact is to be arranged to be bodily slid in the insertion direction of the fluid line so that it is readily possible for it to comply with and follow a longitudinal movement. In this respect the signal contact is aided by spring means holding it in contact with the respective signal conductor. Although in the insertion direction the signal contact is able to be slid, athwart such direction the signal contact is essentially in a fixed position in relation to the contacting signal conductor.

Advantageous developments of the invention will be seen from the dependent claims and the specification.

The at least one signal contact is preferentially secured to a contact carrier in a manner providing support in a direction athwart the insertion direction of the fluid line, such carrier being mounted in a sliding fashion on the connection union in the insertion direction of the fluid line.

Preferably the at least one signal contact is able to be at least frictionally secured to the fluid line in relation to the at least one signal conductor. This means that the action of the spring means is advantageously enhanced.

The at least one signal conductor is advantageously arranged in a signal conductor passage of the fluid line. The at least one signal contact is preferably so designed that it may bite into a section of the signal conductor from end of the fluid line. Here it is held for example frictionally and more especially by a clamping action. For biting into the signal conductor passage the signal contact preferably possesses a point. The signal conductor passage is for example arranged in the interior of a projection extending into the fluid duct.

The at least one signal contact is preferably provided with an abutment acting oppositely to the insertion direction, and against which the at least one signal contact may bear on insertion of the fluid line its the socket. This measure is particularly effective in combination with the above mentioned measure: the signal contact may on insertion of the fluid line rest against an abutment so that the signal contact may penetrate or bite into a section of the signal conductor passage. The abutment may furthermore protect the signal contact or, respectively, the spring means against overloading.

It is convenient for a contact seal means to be provided, which seals off at least signal contact in the mounted state thereof from the at least one fluid duct. Dirt particles in the fluid or pressure medium or other oxidizing and/or contaminating materials can then not impair the contact between the signal conductor and the signal contact.

The spring means are preferably biased toward the opening into which insertion is to take place. They are furthermore preferably designed in the form of a connection line leading to the at least one signal contact. However, it is also possible for the spring means to comprise a spring means separate from the at least one signal contact.

The positioning of the at least one signal contact of the connection union in relation to the at least one signal conductor and accordingly the handling of the initially mentioned technical arrangement and of that in accordance with the invention is facilitated by the following particularly preferred measure, which in principle in conjunction with a connection union or a fluid power means of the type initially mentioned constitutes an invention in its own right. Here there is the provision that adjacent to or at the socket a guide means is provided for setting the fluid line at a predetermined angular position, such guide means being able to be inserted into the at least one fluid duct and on such insertion slides along at least one angular position code means arranged in the at least one fluid duct so that the fluid line is able to be brought, prior to contacting the at least one signal contact with the at least one signal conductor, into a predetermined angular position. The desired angular position, necessary for contacting the at least one signal conductor, is readily set. Operation is simple, a reliable making of contact of the at least one signal conductor being produced by the at least one signal contact.

Preferably the guide means is so designed that by insertion of the fluid line the predetermined angular position may be reached prior to fixation of the fluid line by the holding device. The fluid line can be readily turned into the angular position before the holding means obstructs rotation or even halts it. Preferably the guide means is arranged on the fluid line socket. In this case a central arrangement is preferred.

It is convenient for the guide means to be adapted to center the fluid line at the fluid line socket, it however also being possible to have a centering means, as for example a centering pin or the like, separate from the guide means.

It is an advantage for the fluid line socket to have an abutment on it for the fluid line, beyond which guide means projects. The fluid line may then slipped onto the guide means, as it were, and thrust forward to the abutment.

Preferably at least one cam is arranged cooperating with the angular position code means. The cam means for example that the fluid line may be connected with the connection union in a combined rotary and plugging movement, the cam implying an additional rotary movement on insertion of the fluid line. However, a reversed embodiment is possible in which the angular position code means comprises at least one cam or is constituted by a cam.

As regards the angular position code means various different designs are possible able to be combined with one another, and for example it may be constituted by the cross sectional geometry of the fluid duct, an elliptical or polygonal cross section being suitable for setting one or more angular positions. Moreover at least one groove and/or at least projection may be provided as a angular position code means. In such a projection the at least one signal conductor is preferably arranged. In any case the guide means is designed for cooperation with the correspondingly designed angular position code means and has for this purpose, for example, lugs, pins or the like, adapted to match the cross sectional geometry of the fluid duct or, respectively, the grooves and the projections.

In a particularly preferred form of the invention the guide means comprises at least two lugs adapted to the outline of the fluid duct, which lugs in the mounted state engage the outline of the fluid duct. The lugs are preferably connected together by a stabilizing rib.

Dependent on the type, manner of functioning and number of the signal conductor(s) of the fluid duct the predetermined angular position may be a unique angular position or it is possible for a plurality of radially symmetrical angular positions to be provided. If only one single signal conductor is present, only one single angular position is possible. If however for example two signal conductors are present, in the case of which no electrical polarity is involved, for example two radially symmetrical angular positions may be set by the guide means in accordance with the invention.

The guide means is preferably arranged on the contact carrier.

The guide means is preferably arranged to project past the at least one signal contact. This means that there is the following course of events on attaching the fluid line to the connection union by plugging: the guide means is inserted into the fluid duct and so that the predetermined angular position of the fluid line is reached in relation to the connection union. It is only when this angular position is reached that the at least one signal contact comes into contact with the at least one signal conductor. It may for example for example bite into a signal conductor passage of the fluid line during a longitudinal movement in the insertion direction.

In the case of the fluid line the following measures are preferred:

The fluid line preferably has at least one fluid duct with at least one angular position code means, into which a guide means of the connection union may be inserted, the guide means being able to slide along the at least one angular position code means in the course of such insertion.

Its end is preferably essentially planar. Such planar end or end face is for example produced by cutting the fluid line.

The fluid line may be in the form of a flexible hose line and/or a rigid pipe.

The wall of the fluid line is preferably designed for an optimum pressure sealing action in the connection zone. For instance, in accordance with a preferred form of the invention its external surface keeps to a close tolerance. It will be clear that the fluid line is preferably precision finished externally along its entire length so that it may be severed, for example, using a knife, to a given length at any desired point and may be joined to the connection union of the invention.

Furthermore the fluid line is preferably such that at least in its part intended for connecting with the connection union it has an even outline without projections or grooves. The outline is preferably exclusively or substantially convex, and curved outward, although outwardly non-curved, flat sections are possible.

The angular position code means is preferably arranged on the inner side of the fluid line. It can also be constituted by the wall.

The wall of the fluid line is preferably made essentially of plastic.

In the case of the at least one signal connection union it may be a question of an conductor which is substantially incompressible in the length direction of the fluid line, for example in the form of a fiber-glass arrangement or a metal wire. Preferably however the at least one signal conductor is able to be compressed in the length direction of the fluid line. More particularly under the action of the at least one signal contact it is possible for the signal conductor to be forced, as it were, into the wall or displaced into this position during insertion of the fluid line into the connection union.

Preferably the connection union constitutes an integral component of the fluid power means. It is convenient for the connection union to be at least partly constituted by a housing of the fluid power means, the plug socket being arranged in the housing of the fluid power means or being constituted by it.

In the following several embodiments of the invention will be described with reference to the drawings.

DESCRIPTION OF THE PREFERRED EMBODIMENTS

Figure 1:
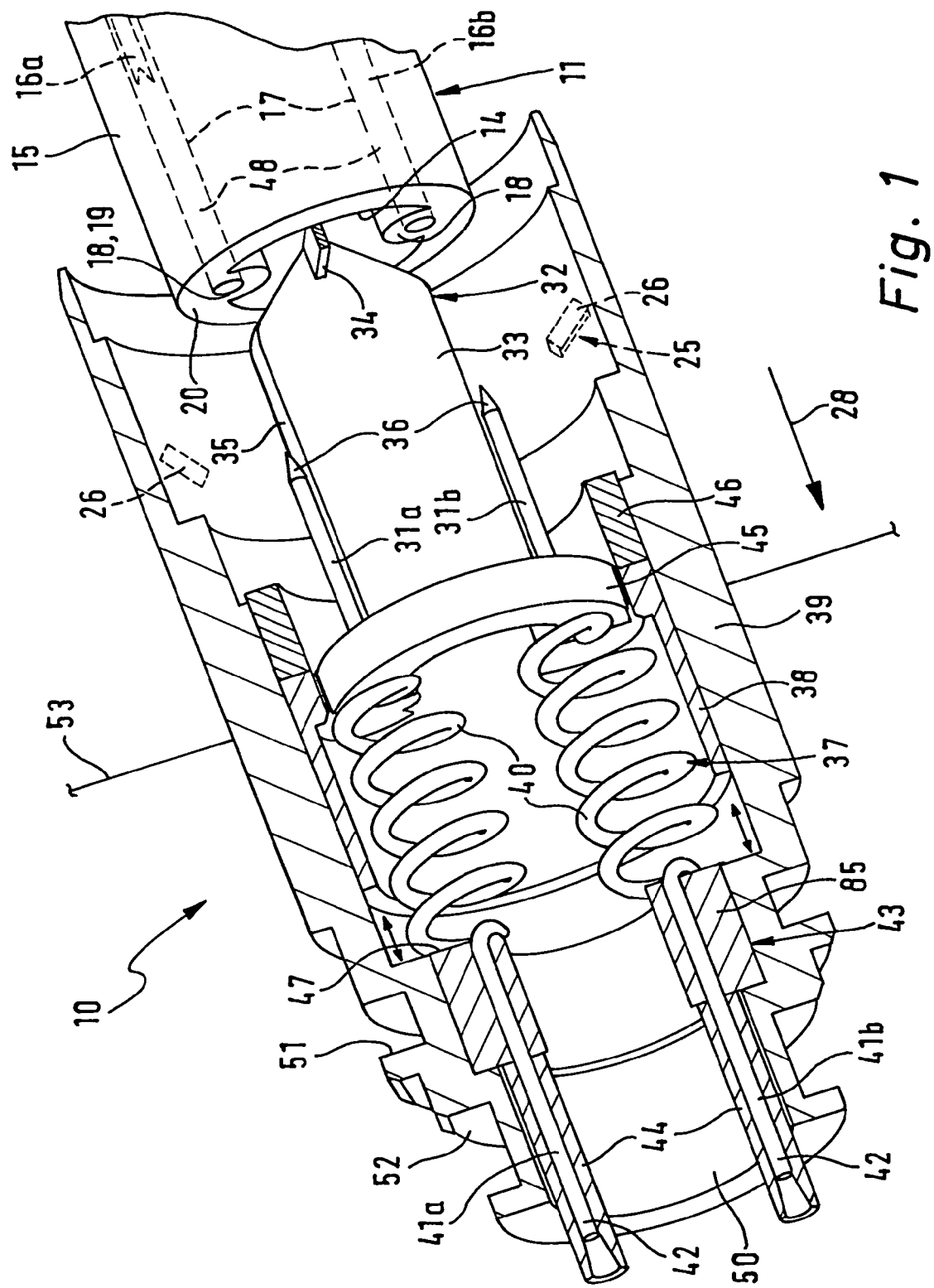
FIG. 1 shows partly in section a connection union in accordance with the invention and a fluid line in accordance with the invention during the insertion operation, some components being omitted.

In the fluid power arrangement 12 valve arrangements 60 of a valve unit or cluster 61 are connected by way of fluid lines 11 with fluid power means 62. In the case of the means 62 it is a question of pneumatic power cylinders, as for example in the form of pneumatic linear drives or the like. The valve arrangements 60 in the present case comprise pneumatic pilot valves, which are operated electrically and/or electromagnetically. In accordance with the pilot action owing to the valve arrangement 60 it is possible for the power cylinders 62 to be supplied with compressed air or compressed air may leave the power cylinders, the respective pistons thereof being moved.

The valve unit 61 is supplied with compressed air by way of a compressed air supply line 66. The valve arrangements 60 are controlled and monitored by a local controller 65 of the valve unit 61. A central controller 63 controls and monitors the valve unit 61 by way of a control and monitoring line 64, which for instance is provided in a bus.

The power cylinders 62 are connected by way of fluid lines 11 with the valve unit 61. The fluid lines 11 are designed for the combined transfer of fluid, in the present case compressed air, and electrical and/or optical signals along a single connection line. In the case of the signals it is a question for example of electrical or optical signals, using which sensors 30, for example position sensors, condition information may be transmitted to the valve unit 61 or using which electrically or, respectively, optically controlled actuators for fluid power means (not illustrated in the figure) may be controlled.

The fluid lines 11 are in the present case in the form of flexible hose line. They are for example extruded plastic lines, whose wall 15 surrounds at least one fluid duct 14, which extends in the interior of the respective fluid line 11. In the present case the wall 15 has on the outside an exactly circular periphery and internally an essentially circular inner periphery defining the cross section of the fluid line 11. In the wall 15 signal conductors 16a and 16b are arranged, which in the present case consist of electrically conductive material, as for example of copper stranded wire or copper wire. At those position, where the signal conductors 16a and 16b are arranged in the wall 15 the wall has a thicker cross section. This thicker cross section in the present case has more particularly rib-like projections 18 extending along the full length of the fluid line 11, such projections 18 fitting into the wall 15 at the fluid duct 14, a signal conductor passage 17 being respectively arranged for a signal conductor 16a and 16b. In the case of the fluid line 11 the design of the inner face of the wall 15 and more particularly the radially symmetrical arrangement of the projections 18 constitutes an angular position code means 19 in order to ensure a correct angular positioning of the fluid line 11 in the connection unions 9 and 10 of the valve unit 61 and, respectively, of the power cylinders 62.

With reference to the connection union 10 and the fluid line 11 in the following the connection technology will be explained, which is improved by the invention. The fluid line 11 is able to be cut to the desired length at any desired point. The signal conductors 16a and 16b do then not project past an essentially flat or planar face 20, which is formed for example but cutting the fluid line 11 to the desired length, and are in fact flush with it or are even retracted somewhat behind it, this however impeding the production of a reliable contact connection with the connection union 10. Nevertheless, the fluid line 11 may in a simple manner be fitted to the connection union and is then reliably and permanently joined to it.

The fitting of the fluid line 11 to the connection union 10 is performed as follows: The fluid line 11 is inserted through an insertion opening 21 into a front section 22 of a plug socket 23. The front section 22 is constituted by a release ring 24 opening like a funnel-like manner toward the insertion opening 21, such ring serving as a release means for release of a holding device 25.

The holding means 25 comprises elastically flexible teeth or claws extending into the plug socket 23 and which are inclined in relation to the longitudinal axis of the plug socket 23 and are pivoted on a holding ring 27 so that on insertion of the fluid line 11 into the plug socket 23 they may be displaced radially outward. On retracting the fluid line 11 from the plug socket 23 or releasing it from some other force acting on the fluid line 11 against the direction 28 of insertion the teeth 26 bite into the fluid line 11 and accordingly hold same fast.

However, even before the holding action of the holding device 25 comes into play, the fluid line 11 is moved by a guide means 32 into a predetermined angular position on insertion of the plug socket 23, at which angular position the signal contacts 31a and 31b of the connection union 10 may produce electrical connections with the signal conductors 16a and 16b.

The guide means 32 projects past the signal contacts 31a and 31b toward the insertion opening 21. The guide means 32 is able to be introduced into the fluid duct 14 and in the course of such introduction slides along the angular position code means 19 constituted by the form of the fluid duct 14 and, respectively, the projections 18 to move the signal contacts 31a and 31b into a suitable angular position in relation to the signal conductors 16a and 16b.

The guide means comprises mutually opposite lugs 33, which taper toward the opening 21, in the present case to a point. In their front part the lugs 33 are joined together by a transverse rib 34. It is only in the rare case when the lugs 33 exactly hit the projections 18 on introduction of the fluid line 11 that it is necessary for the fluid line 11 to be turned to a slight extent intentionally. Otherwise—and this is by far and away the commonest case owing to the geometry of the shape of the fluid duct 14—the cams 35, which in the present case are constituted by the lateral sides of the front part, which runs to a point, of the lugs 33, have the effect that the fluid line 11 and/or the connection union 10 are so turned on insertion in the insertion direction 28 that the predetermined angular position is reached. When this happens the cams 35 slide along the projections 18 acting as the angular position code means 19. The fluid line 11 will in any case reach this angular position automatically and of its own accord.

The guide means 32 serves furthermore for centering the fluid line 11 in the plug socket 23. The lugs 33 are for this purpose adapted to the outline of the fluid duct 14 and in the specific case in hand are curved athwart the insertion direction 28 and in relation to the outer periphery of the connection union 10. During further insertion of the fluid line 11 into the plug socket 23 the fluid line 11 will slide past the holding device 25 while pushing the teeth 26 out of the way. The fluid line 11 is then clamped as it were between the holding device 25 unit guide means 32 so that it is only able to move farther in the insertion direction 28. Once held in a preliminary manner, on further insertion the fluid line arrives at the signal contacts 31a and 31b, such contacts being in the present case in the form of metal pins.

The signal contacts 31a and 31b have points 36 directed toward the insertion opening 21, and in the course of further insertion of the fluid line 11 they enter the signal conductor passages 17 and accordingly produce electrical connections with the signal conductors 16a and 16b. In the case of the connection union 10 the signal contacts 31a and 31b are arranged so that they may slide in the insertion direction 28 and are provided with spring means 37 so that the signal contacts 31a and 31b will remain connected with the respective signal conductors 16a and 16b even in the case of any longitudinal motion of the fluid line 11 on the connection union 10. Such longitudinal movements take place for example following pressure surges or other changes in pressure in the fluid line 11.

In the present case the signal contacts 31a and 31b are secured to a contact element bearing means 38, that is mounted for sliding movement in the insertion direction 28 on the housing 39 of the connection union 10. The contact element bearing means 38 has in the present case the form of a sleeve, whose outer periphery rests against the housing 39 and in whose interior the spring means 37 extend. The spring means 37 are constituted by sections 40, which are helically twisted, of supply leads 41a and 41b, which lead to the signal contacts 31a and 31b. The leads 41a and 41b are in the present case constituted by rear sections of the signal contacts 31a and 31b.

The ends 42, which are opposite to the signal contacts 31a and 31b, of the supply leads 41a and 41b extend out of the connection union 10 and are for example connected with leads 29, which run from the connection union 10 to the sensor 30. The leads 41a and 41b are electrically and mechanically separated from the surroundings by an insulating element 43. A sleeve-like body 85 of the insulating element 43 is arranged in the housing 39, the leads 41a and 41b being arranged in the wall of the body 85. The sections 44, which in the present case are flexible, of the insulating element 43 project in front of the housing 39, and the ends 42 of the leads 41a and 41b are arranged in the sections 44. The sections 44 are able to be slid toward the housing and/or drawn back from it and have funnel-like openings able to accept the electrical contact elements for making electrical contact with the ends 42. The section 44 are elastic and may form a sort of bead or overlapping structure over a contact area, for example on a printed circuit board, on which the ends 42 are for example seated.

Facing the insertion opening 21 a sealing ring 45 is arranged on the contact element bearing means 38, such ring 45 having the signal contacts 31a and 31b extending through it to hold same. In the present case the sealing ring 45 serves to secure the signal contacts 31a and 31b on the contact element bearing means 38. The signal contacts 31a and 31b may however also be directly secured on the contact element bearing means 38.

The spring means sections 40 each have their one end bearing against the contact element bearing means 38 and/or against the sealing ring 45 while the other end bears against the housing 39, that is to say in the present case on the insulating element 43. The spring means 37 are biased against the insertion direction 28, the contact element bearing means 38 bearing on a support ring 46 or some other abutment in a direction opposite to the insertion direction 28.

In the present case the guide means 32 is arranged on the contact element bearing means 38 and projects to the front thereof toward the insertion opening 21 If now on insertion of the fluid line 11 into the connection union 10—one could in the present case speak of "slipping the fluid line 11 over the guide means 32"—the signal contacts 31a and 31b strike the end face 20 of the fluid line 11 or, respectively, the signal conductors 16a and 16b, the fluid line 11 will sort of slide the signal contacts 31a and 31b in the insertion direction 28 in relation to the housing 39 to the rear. When this happens, the contact element bearing means 38 will be bodily displaced to the rear and the spring means 37 will be stressed until the contact element bearing means 38 hits an abutment 47, which is constituted by a step on the housing 39 and/or the body 85 of the insulating element 43. The signal contacts 31a and 31b may then not be slid any farther in the insertion direction 28 and on further insertion of the fluid line 11 move farther into the connection union 10 in the sections 48 of the conductor passages 17 until the fluid line 11 strikes the sealing ring 45, which constitutes an abutment associated with the plug socket 23. The sealing ring 45 then makes sealing contact with the end side 20 of the fluid line so that the signal contacts 31a and 31b are protected against fluid or other oxidizing and/or contaminating materials.

In the case of a longitudinal movement of the fluid line 11 in the connection union 10 as well the sealing ring 45 reliably engages the end side 20 owing to the spring means 37. Furthermore—and this is a particularly important point—the signal contacts 31a and 31b essentially remain in the same position in relation to the fluid line 11 in the longitudinal direction. During a longitudinal movement of the fluid line 11 they are also moved resiliently and so reliably maintain the contact with the signal conductors 16a and 16b.

Although it would in principle be possible for the signal contacts 31a and 31b to be able to move in the longitudinal direction in the sections 48 of the signal conductor passages 17, in the present case however the signal contacts 31a and 31b have such a cross section and/or such a surface that in the sections 48 they are held by friction or even with a clamping action. The cross section of the signal contacts 31a and 31b is for example larger than that of the signal conductor passages 17. The surface is for example rough, ribbed, grooved or the like.

As for the electrical contact between the signal contacts 31a and 31b and the signal conductors 16a and 16b, there are various different possibilities. As an example the signal contacts 31a and 31b may partly or completely displace the signal conductors 16a and 16b from the sections 48, as is indicated in FIG. 1. It is however also possible for the signal contacts 31a and 31b to enter the signal conductor passages 17 adjacent to the signal conductors 16a and 16b and/or to cut into the signal conductors 16a and 16b so that the latter in the sections 48 may assume positions at least partly adjacent to the signal contacts 31a and 31b. This design is particularly preferred, since it renders possible a good electrical connection.

Although the elongated shape of the signal contacts 31a and 31b and accordingly their entry into the signal conductor passages 17 is particularly preferred, it would in principle be possible to have contact faces lying flat against the sealing ring 45 or contact faces which are curved toward the insertion opening 21, such faces preferably being faces on spring contact elements. Such contacts could provide a reliable connection with the signal conductors 16a and 16b even if the latter were flush with the end face 20.

Between the holding device 25 and the support ring 46 a fluid seal 86 in the form of an O ring is provided, which with a fluid line 11 inserted into the connection union 10 makes contact with the outer side thereof and provides a fluid sealing action. Fluid from the fluid duct 11 may therefore flow past the contact element bearing means 38, in the present case through the same, to an connection opening 50 on the side opposite to the insertion opening 21, of the connection union 10 and thence for example to a chamber of the power cylinder 62.

For the release of the fluid line 11 from the holding device 25 the release ring 24 is moved in the insertion direction 28 so that the said lugs 33 are moved clear of the outer periphery of the fluid line 11 and same may be drawn out of the connection union 10.

The housing 39 of the connection union 10 has external steps 51 and a seal 49 seated in the groove 52 constituted by the steps 51 so that for example it may be screwed or thrust into a housing 53 of the power cylinder 62.

Figure 3A:
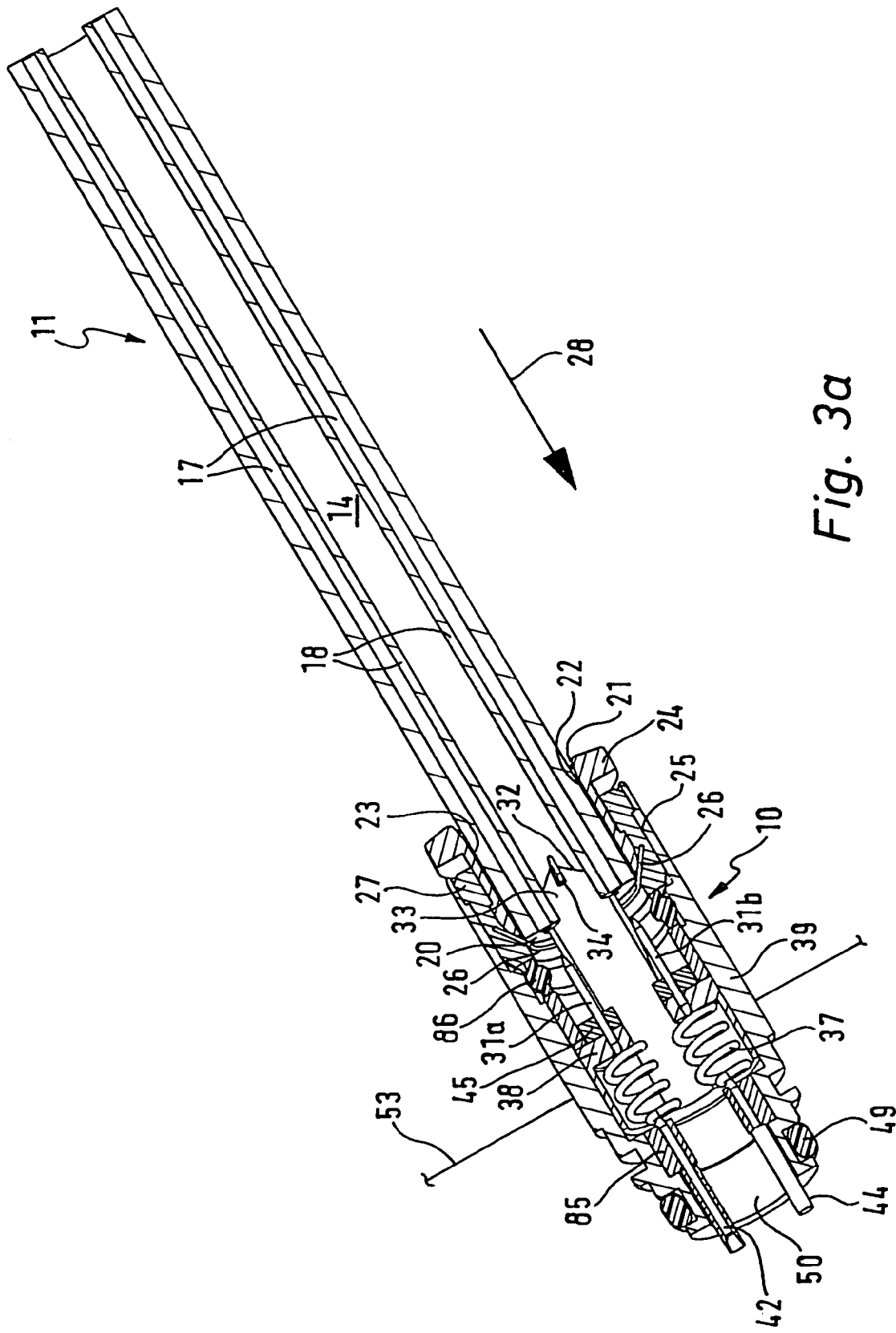
FIG. 3a shows a connection union and a fluid line in accordance with FIG. 1 also in a cross sectional elevation during the insertion operation, without the omission of any components of the connection union as in FIG. 1.
Figure 3B:
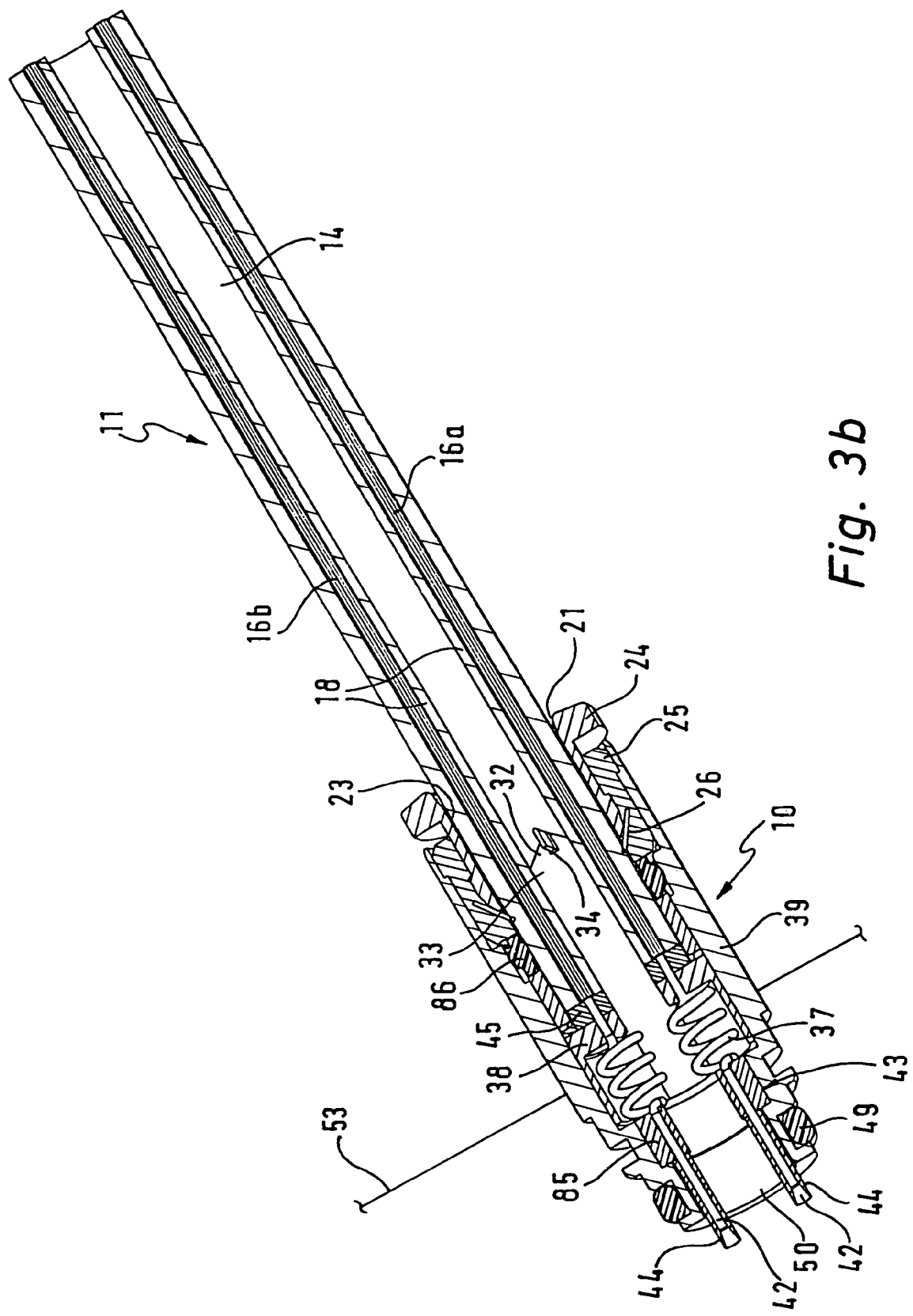
FIG. 3b shows the view as in FIG. 3a, the fluid line being completely inserted into the connection union.
Figure 3C:
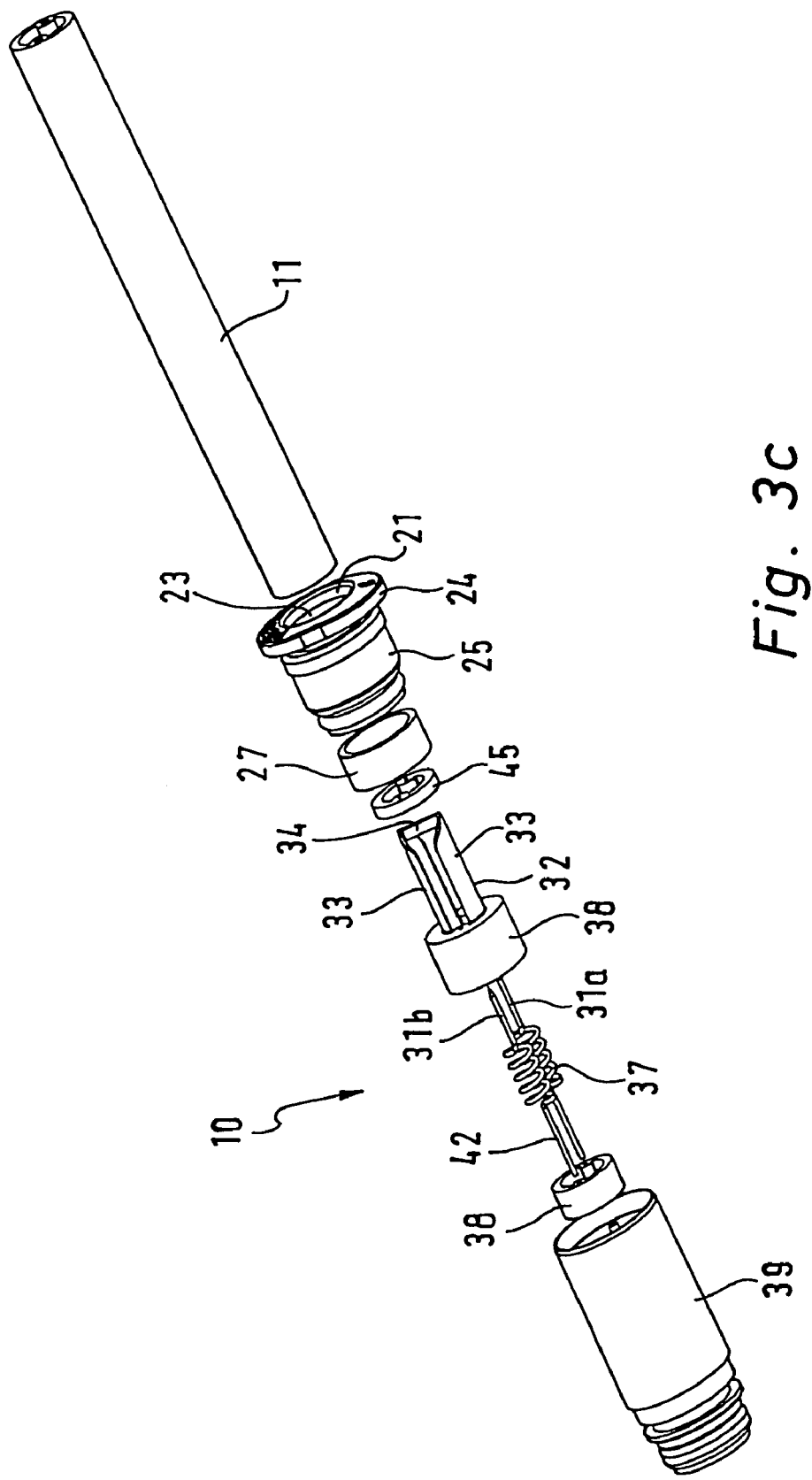
FIG. 3c is an exploded view of the connection union and of the fluid line in accordance with FIGS. 1, 3a and 3b.
Figure 3D:
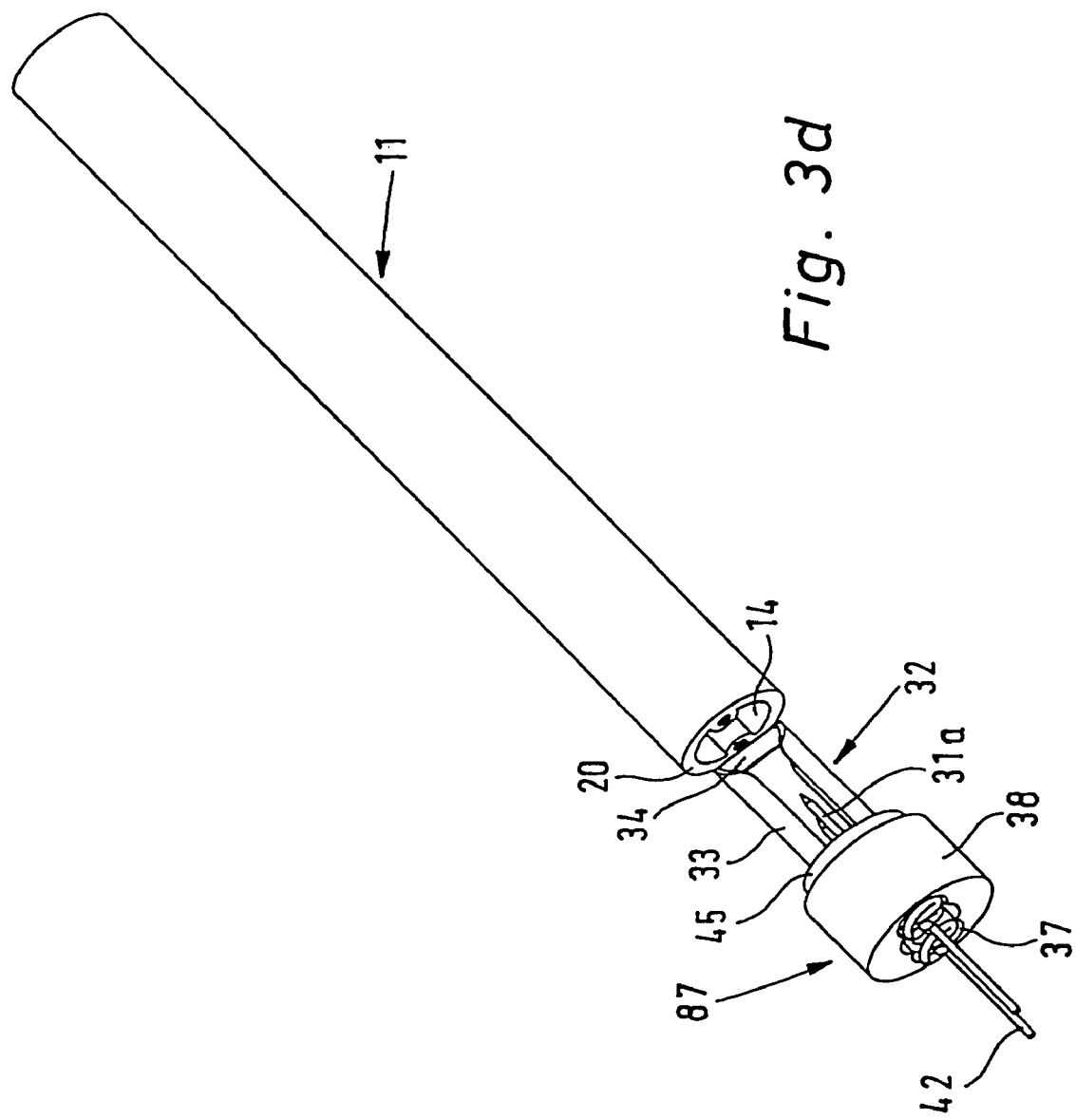
FIG. 3d shows a simplified design of the connection union in accordance with FIGS. 3a through 3c.

However, the housing of a connection union could in principle also be formed by a housing of a fluid power means, as for example by the housing 53. For instance, the connection union 87 as shown in FIG. 3d, which unlike the connection union 10 does not have any housing of its own, could be incorporated in a housing of a fluid power means.

In the present case the fluid line 11 has a strictly minimum external diameter tolerance, something rendering possible a high quality seal at the connection union 10. A further contribution to a satisfactory seal is that the fluid line 11 has a circular outline. In this respect it is to be noted however that in principle other outlines would be possible, for instance a polygonal or elliptical one.

Figure 2:
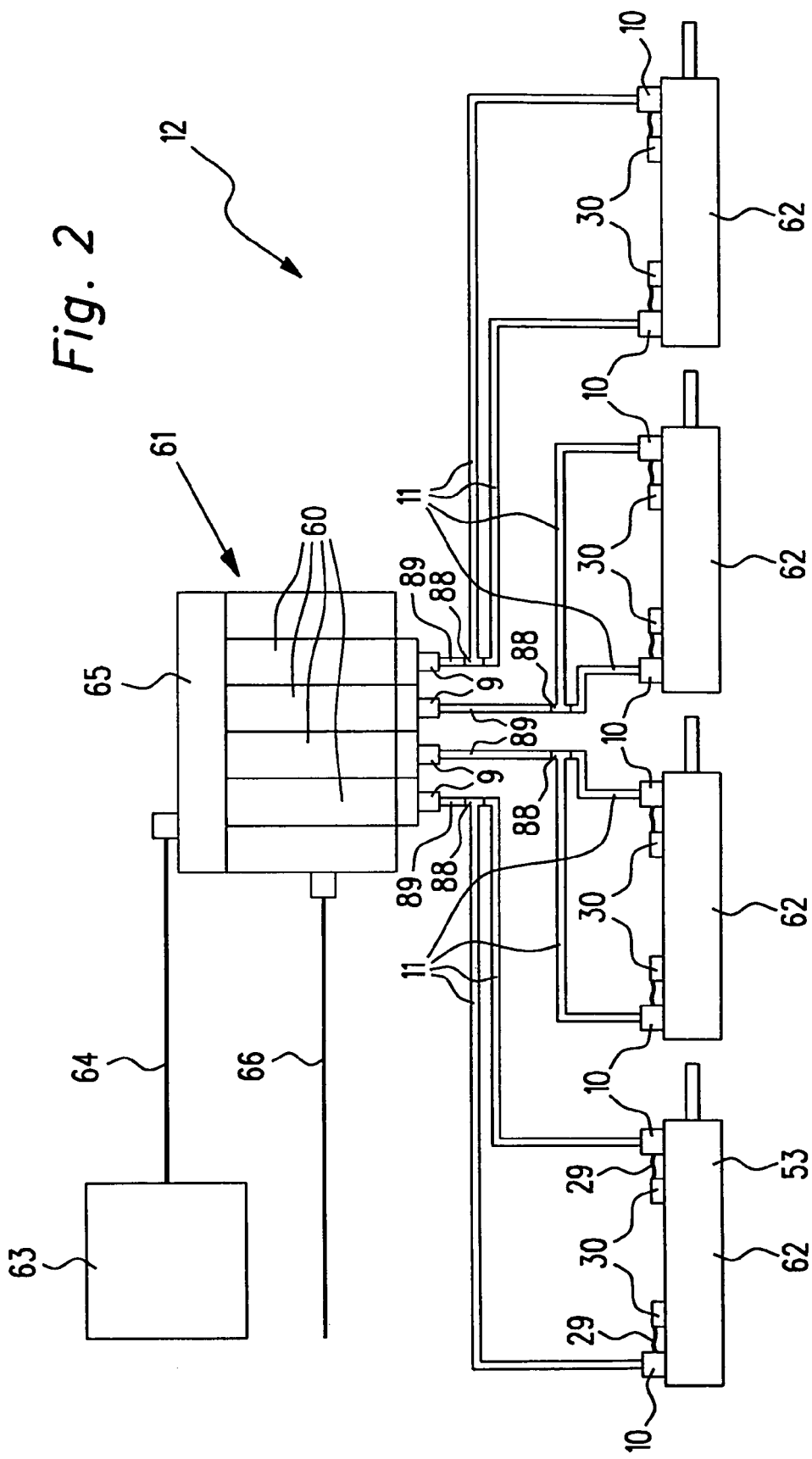
FIG. 2 shows a fluid power arrangement in the case of which a connecting technique in accordance with the invention is employed.

It is preferred for the fluid line 11 to possess an even cross section along its entire length so that it can be cut at any position and still fit the connection union. Designs are however also possible in the case of which a fluid line has branches as illustrated in FIG. 2 for example. In this case the line itself may possess branches and/or, as in FIG. 2, for example T-unions 88 are present to form branches. The connection unions 9 of the valve arrangements 60 may for example be designed to receive two particular fluid lines of the type 11 or for example to receive a fluid line 89 with for example two, of which one branches at the respective T-union 88 into a fluid duct of a fluid line 11.

Figure 5:
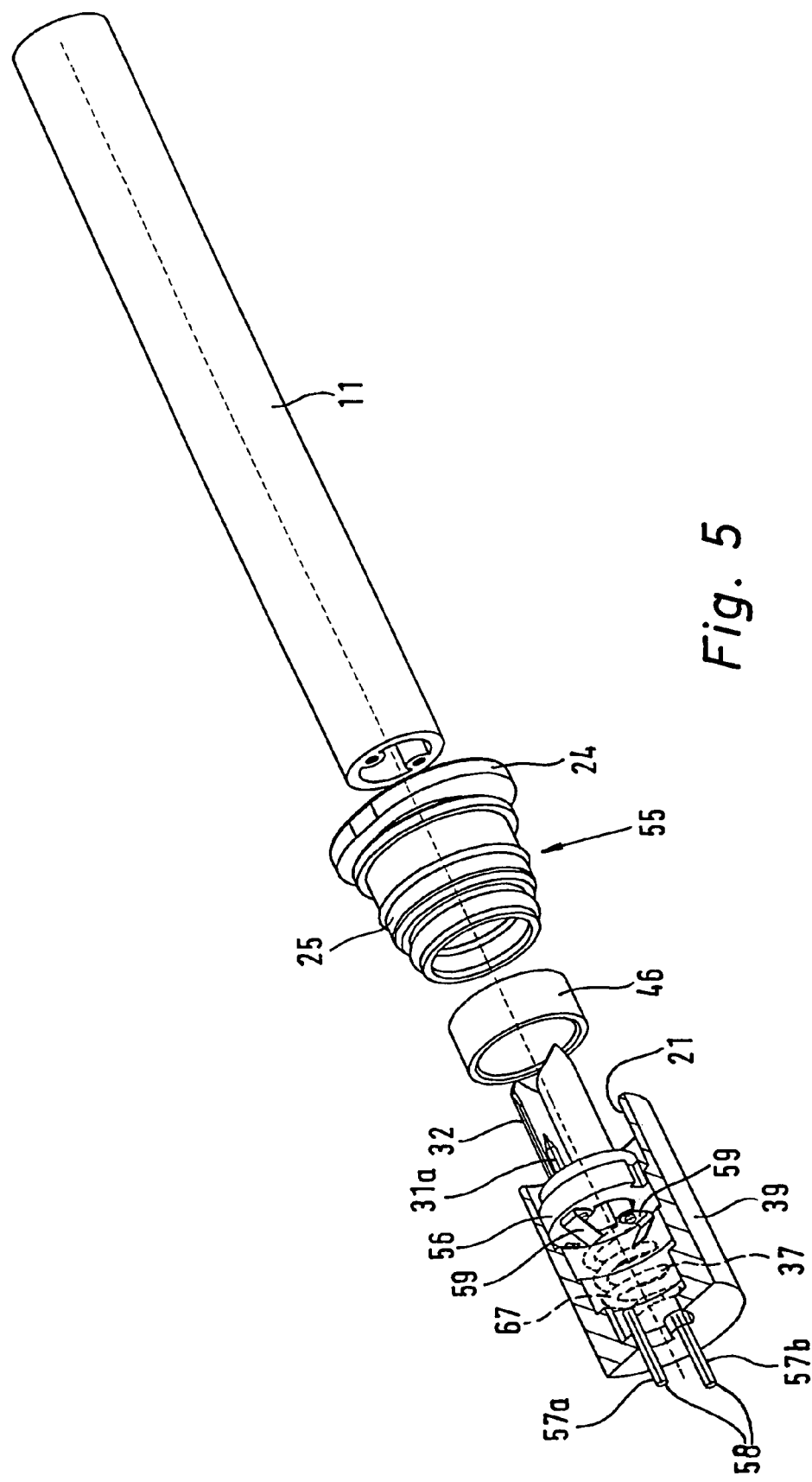
FIG. 5 shows a connection union partly modified to differ from the union 10.

The connection union 13 depicted in FIG. 5 has in principle the same structure as the connection union 10. Similar components are provided with the same reference numerals. The differences will be described in the following.

The holding device 25 and the release ring 24 constitute a subassembly 55, which is able to be inserted into the housing 39. A contact element bearing means 56 is arranged in this housing able to slide in the insertion direction 28, such bearing means essentially having the same function as the contact element bearing means 38: on it the signal contacts 31a and 31b are secured athwart the direction 28 of insertion 28 and furthermore the guide means 32 is fixed on it. Instead of the leads 41a and 41b the leads 57a and 57b are provided, which possess contact pins 58 projecting past the housing 39 and furthermore spring contacts 59 arranged between the contact pins 58 and the signal contacts 31a and 31b. The spring contacts 59 serve on the one hand for electrical signal transmission between the contacts 31a and 31b and the contact pins 58 and on the other hand as spring means 37 in accordance with the invention, which bias the contact element bearing means 56 toward the insertion opening 21.

A spring 67 is indicated in chained lines, which instead of or in addition to the spring contacts 59 could perform the function of spring means 37 in accordance with the invention. The contacts 37a and 37b and the contact pins 58 could be connected with flexible lines (not illustrated) instead of with the spring contacts 59.

Various different forms of angular position code means in accordance with the invention are to be seen in the case of the fluid lines 68 through 71 in FIGS. 4a through 4d. In the following components with equivalent functions are provided with reference numerals as in FIGS. 1 through 3.

The wall 15 of the fluid line 68 is externally circular but internally defines a fluid duct 72 tending to be elliptical. Moreover, on the bore face of the wall 15 mutually opposite grooves 73 are arranged, which constitute a angular encoding means. In the grooves 73 groove pieces 74 are arranged, which constitute a guide means of the invention. The groove pieces 74 are for example designed tapering to a point like the lugs 33 so that same may be readily introduced into the grooves 73. On introduction of the groove pieces 74 into the fluid duct 72 in principle two alternative angular positions of the fluid duct 68 in relation to the connection union are possible, in the case of which the signal conductors 16a and 16b arranged in the wall 15 may come into contact with the signal contacts, associated with them, on the connection union.

Figure 4A:
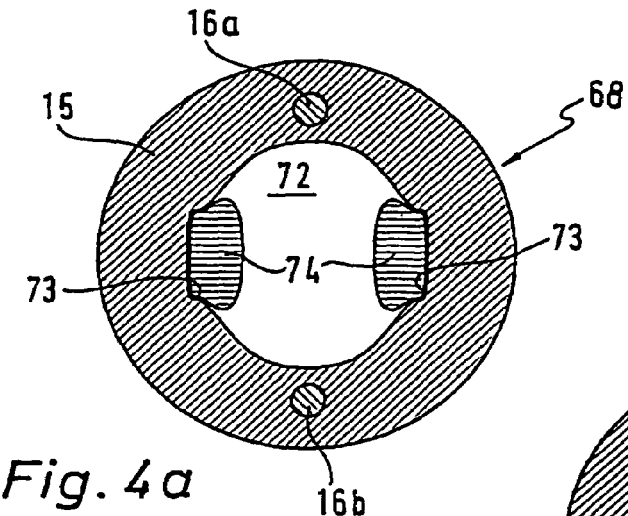
FIGS. 4a to 4d show cross sectional views of the fluid lines in accordance with the invention, in whose fluid ducts a guide means in accordance with the invention is respectively introduced.
Figure 4B:
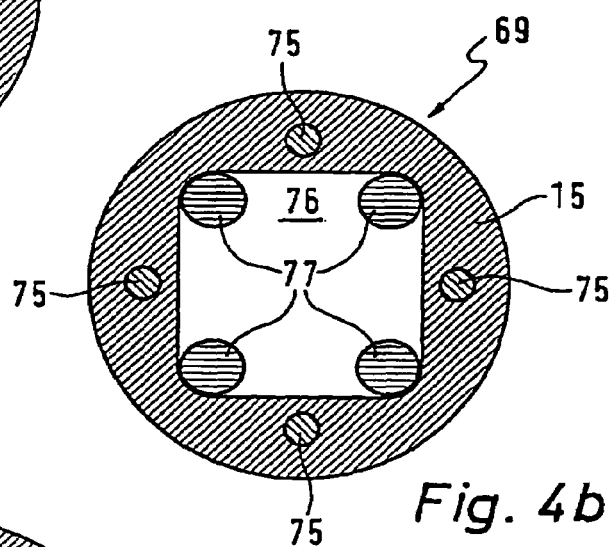

Four possible angular positions are possible in the case of the fluid line 69 in accordance with FIG. 4b, which has a circular outline and internally has a fluid duct 76 with an essentially square cross section, which constitutes a angular encoding means. On the lateral edges of this fluid duct 76 there rest, for example guide elements 77 in the form of guide rods, as part a guide means in accordance with the invention. In each case generally in the middle of the lateral faces of the fluid duct 76, that is to say where the wall 15 has a maximum thickness, signal conductors 75 are arranged.

Figure 4C:
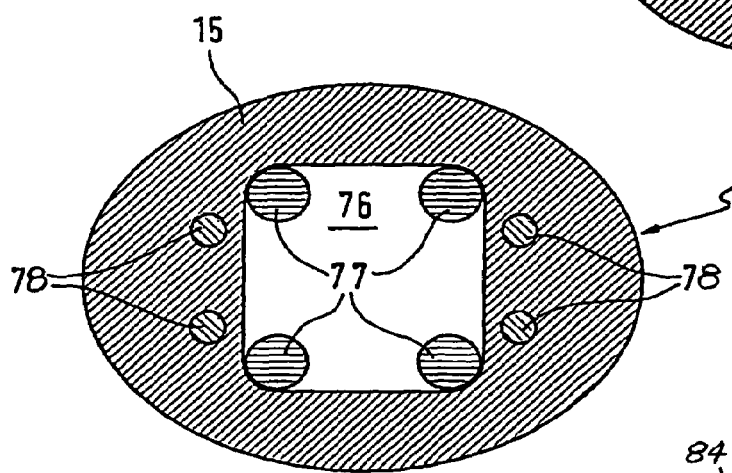
Figure 4D:
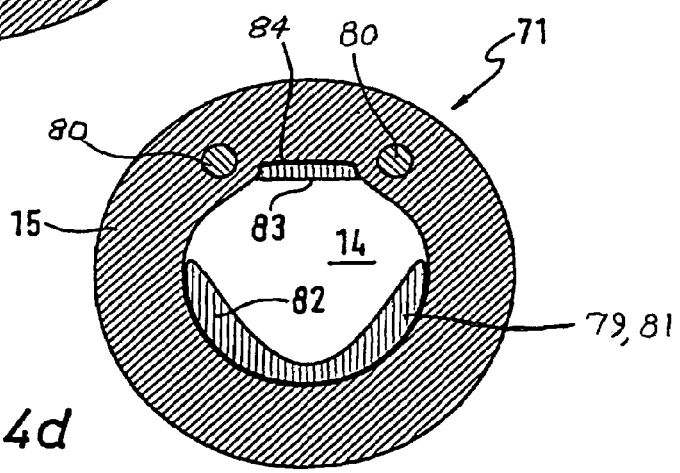

The fluid line 70 in accordance with FIG. 4c has an elliptical outline and an essentially square cross section fluid duct 76 (into which the guide elements 77 are inserted) as in FIG. 4b. In the case of the fluid line 70 both its outline and also the square cross section of the fluid duct 76 constitute angular encoding means. In the case of the fluid line 70 four signal conductors 78 are provided, which are respectively arranged in pairs at opposite lateral faces of the fluid duct 76. Here as well the signal conductors 78 are placed where the wall 15 has its maximum thickness, as was the case with the fluid line 69.

In contradistinction to all examples so far in the case of the fluid line 71 only one single angular position is possible on connection with a suitable connection union 79. Such a design will be selected for example when only one single signal conductor is present or when a plurality of signal conductors 80 are to be connected up without any chance of connection reversal. The connection union 79 possesses a guide means 81 with a spur 83 and a lug 82 opposite to it. The spur 83 runs in a groove 84, constituting the angular encoding means, in the wall 15. The lug 82 rests against the opposite section, which is substantially circular, of the wall 15.

The invention claimed is:

1. A connection union for a fluid line containing a fluid duct, whose wall comprises at least one signal conductor for the transmission of electrical and/or optical signals, comprising a plug socket for the fluid line, a holding device for holding the fluid line in the mounted state and at least one signal contact for the production of a connection with the at least one signal conductor, wherein the at least one signal contact is able to be slid in the insertion direction of the fluid line and wherein the at least one signal contact is provided with spring means acting toward an insertion opening for the fluid line so that in the case of a longitudinal movement of the fluid line mounted on the connection union, the at least one signal contact remains in connection with the at least one signal conductor.

2. The connection union as set forth in claim 1, wherein the at least one signal contact is fixed on a contact carrier which is slidingly mounted on the connection union for movement in the insertion direction of the fluid line.

3. The connection union as set forth in claim 1, wherein the at least one signal contact is able to be at least frictionally secured to the fluid line in relation to the at least one signal conductor.

4. The connection union as set forth in claim 1, wherein the at least one signal conductor is arranged in a signal conductor passage in the fluid line and in that the at least one signal contact is so designed that it may bite into a section of the signal conductor passage at the end.

5. The connection union as set forth in claim 1, wherein the at least one signal contact is provided with an abutment effective opposite to the insertion direction, on which the at least one signal contact may bear against on insertion of the fluid line into the fluid line.

6. The connection union as set forth in claim 5, wherein the at least one signal contact possesses a point for penetrating into the signal conductor passage.

7. The connection union as set forth in claim 5, wherein the at least one signal contact is so designed that it is held by a clamping action in the signal conductor passage.

8. The connection union as set forth in claim 1, further comprising a contact seal means effective in the mounted state between the at least one signal contact and the at least one fluid duct.

9. The connection union as set forth in claim 1, wherein the spring means are biased toward the insertion opening.

10. The connection union as set forth in claim 1, wherein the spring means are designed in the form of a connection line leading to the at least one signal contact.

11. The connection union as set forth in claim 1, wherein the spring means comprise at least one spring arrangement separate from the at least one signal contact.

12. The connection union as set forth in claim 1, further comprising a guide means provided adjacent to the fluid line socket for the arrangement of the fluid line with a predetermined angular position, such guide means being able to be inserted into the at least one fluid duct and in the course of such insertion to slide along at least one angular position code means arranged in the at least one fluid duct so that the fluid line is able to be brought, prior to making contact between the at least one signal contact and the at least one signal conductor, into a predetermined angular position.

13. The connection union as set forth in claim 12, wherein the guide means is so designed that on insertion of the fluid line, the predetermined angular position may be reached even prior to fixation of the fluid line by the holding device.

14. The connection union as set forth in claim 12, wherein the guide means is centrally arranged on the fluid line socket.

15. The connection union as set forth in claim 12, wherein the guide means is designed to center the fluid line at the fluid line socket.

16. The connection union as set forth in claim 12, wherein an abutment is arranged for the fluid line at the fluid line socket and wherein the guide means projects to the fore of the abutment.

17. The connection union as set forth in claim 12, wherein the guide means possesses at least one cam cooperating with the angular position code means.

18. The connection union as set forth in claim 12, wherein the angular position code means is arranged on the inner face of the wall of the fluid line.

19. The connection union as set forth in claim 12, wherein the angular position code means is constituted by the cross sectional geometry of the fluid duct and/or by at least one groove and/or by the at least one projection in which the at least one signal conductor is arranged and that the guide means is designed for cooperation with the suitably designed angular position code means.

20. The connection union as set forth in claim 12, wherein the guide means comprises at least two lugs adapted to the outline of the fluid duct which in the mounted state rest against the outer face of the fluid duct.

21. The connection union as set forth in claim 12, wherein the predetermined angular position is a unique angular position or that the predetermined angular position has at least one second radially symmetrical corresponding angular position.

22. The connection union as set forth in claim 12, wherein the guide means is on the contact carrier.

23. In combination:
   a fluid line for a connection union comprising a fluid duct and a wall having at least one signal conductor for the transmission of electrical and/or optical signals, wherein the fluid line has an end face provided for the connection with the connection union wherein the end face is flush with the at least one signal conductor or in relation to said end face the at least one signal conductor is retracted; and
   a connection union comprising a plug socket for the fluid line, a holding device for holding the fluid line in the mounted state and at least one signal contact for the production of a connection with the at least one signal conductor, wherein the at least one signal contact is able to be slid in the insertion direction of the fluid line and wherein the at least one signal contact is provided with spring means acting toward an insertion opening for the fluid line so that in the case of a longitudinal movement of the fluid line mounted on the connection union, the at least one signal contact remains in connection with the at least one signal conductor.

24. The combination as set forth in claim 23, further comprising at least one fluid duct with at least one angular position code means into which a guide means of the connection union can be inserted, the guide means being able to slide along the at least one angular position code means during such insertion.

25. The combination as set forth in claim 24, wherein the end face is essentially planar.

26. The combination as set forth in claim 23, wherein the fluid line is in the form of a flexible hose line and/or a rigid pipe line.

27. The combination as set forth in claim 23, wherein the wall of the fluid line has an external precision finish.

28. The combination as set forth in claim 23, wherein the fluid line connection portion has an even outline without projections and grooves.

29. The combination as set forth in claim 23, wherein the wall is essentially of plastic.

30. The combination as set forth in claim 23, wherein the at least one signal conductor in the wall is able to be compressed in the longitudinal direction of the fluid line owing to at least one signal contact.

31. A fluid power means comprising:
at least one fluid line containing a fluid duct, whose wall comprises at least one signal conductor for the transmission of electrical and/or optical signals; and
at least one connection union having a plug socket for the fluid line, a holding device for holding the fluid line in the mounted state and at least one signal contact for the production of a connection with the at least one signal conductor, wherein the at least one signal contact is able to be slid in the insertion direction of the fluid line and wherein the at least one signal contact is provided with spring means acting toward an insertion opening for the fluid line so that in the case of a longitudinal movement of the fluid line mounted on the connection union, the at least one signal contact remains in connection with the at least one signal conductor.

32. The fluid power means as set forth in claim 31, wherein the at least one connection union constitutes an integral component of the fluid power means.

33. A method for mounting a fluid line on a connecting piece, the fluid line including a wall containing a fluid passage, and the wall incorporating at least one signal conductor for the transmission of electric and/or optical signals inserted into a plug-in socket of the connecting piece, wherein the plug-in socket incorporates a retaining device for retaining the fluid line in the installed state and at least one signal contact for establishing a connection with the at least one signal conductor, the method comprising the steps of:
inserting the fluid line into the plug-in socket whereby the at least one signal contact penetrates into the end of a section of a signal conductor conduit of the fluid line in which at least one signal conductor is located;
displacing the at least one signal contact in the direction of insertion of the fluid line during said insertion step; and
preloading a spring means against the at least one signal contact and acting in the direction towards an insertion opening for the fluid line during said insertion step, so that the at least one signal contact remains connected to the at least one signal conductor despite longitudinal movement of the fluid line mounted on the connecting piece.

34. The method according to claim 33, wherein a guide device of the connecting piece slides along at least one rotary angle encoder of at least one fluid passage of the fluid line during said insertion step.

35. The method according to claim 33, further comprising the step of cuffing the fluid line as required to obtain an essentially flat end face.

36. The method according to claim 33, wherein the fluid line is designed as a flexible hose and/or as a rigid pipeline.

37. The method according to claim 33, wherein the wall of the fluid line is externally calibrated.

38. The method according to claim 33, wherein the fluid line has a homogeneous external contour without any projections and grooves at least in the area designed for connecting the connecting piece.

39. The method according to claim 33, wherein the wall of the fluid line substantially consists of a plastic material.

40. The method according to claim 33, wherein at least one signal conductor is compressible in the wall of the fluid line in the longitudinal direction of the fluid line by the action of the at least one signal contact.

* * * * *